(12) United States Patent
Hamaya et al.

(10) Patent No.: US 7,789,210 B2
(45) Date of Patent: Sep. 7, 2010

(54) SEALING DEVICE

(75) Inventors: Yasunari Hamaya, Fukushima (JP); Kiichiro Goto, Fukushima (JP); Ken Yoshikawa, Fukushima (JP); Shinji Nagasawa, Fukushima (JP); Yoshiyuki Kanzaki, Fukushima (JP); Yasushi Sugiyama, Fujisawa (JP); Hiroyuki Nikamoto, Fujisawa (JP)

(73) Assignee: NOK Corporation (JP)

( * ) Notice: Subject to any disclaimer, the term of this patent is extended or adjusted under 35 U.S.C. 154(b) by 545 days.

(21) Appl. No.: 11/661,559

(22) PCT Filed: Jun. 6, 2005

(86) PCT No.: PCT/JP2005/010318

§ 371 (c)(1),
(2), (4) Date: Feb. 28, 2007

(87) PCT Pub. No.: WO2006/038347

PCT Pub. Date: Apr. 13, 2006

(65) Prior Publication Data

US 2007/0256557 A1   Nov. 8, 2007

(30) Foreign Application Priority Data

Oct. 5, 2004   (JP) .............................. 2004-292286
Oct. 13, 2004   (JP) .............................. 2004-298407

(51) Int. Cl.
  *F16D 25/0638*   (2006.01)
  *F16D 25/12*   (2006.01)
  *F16D 13/70*   (2006.01)
(52) U.S. Cl. ................. 192/85.44; 192/52.6; 192/85.34

(58) Field of Classification Search ..................... 92/84, 92/85 A, 232, 240, 245, 130 B; 267/163; 192/85.34, 85.35
See application file for complete search history.

(56) References Cited

U.S. PATENT DOCUMENTS 3,259,142 A * 7/1966 Richards ..................... 267/158

(Continued)

FOREIGN PATENT DOCUMENTS

JP   51-17756   2/1976

(Continued)

OTHER PUBLICATIONS

International Search Report (in English) and Written Opinion of the International Searching Authority (in Japanese) for PCT/JP2005/010318, dated Aug. 12, 2005; ISA/JP.

*Primary Examiner*—Rodney H Bonck
(74) *Attorney, Agent, or Firm*—Harness, Dickey & Pierce, P.L.C.

(57) ABSTRACT

To make it unnecessary to insert a plate spring as a separate part between a metal ring (2) and a mating member (11) to be coupled therewith such as a clutch plate, and reduce the number of parts and the assembly manhours, the sealing device (1) includes the metal ring (2) and seal sections (3) such as packings supported by the metal ring (2), and the metal ring (2) is provided with a intimate-contact region (4) for intimately contacting to the mating member (11) to be coupled, wherein the sealing device (1) is characterized in that the intimate-contact region (4) of the metal ring (2) is integrally formed with pawl-like intimate-contact sections (6) which are in the form of a pawl and which exert spring force on the mating member (11) to be coupled, and is used, for example, as a bonded piston seal (BPS) in an automatic transmission.

6 Claims, 9 Drawing Sheets

U.S. PATENT DOCUMENTS

2004/0144614 A1 * 7/2004 Ookita et al. ........... 192/85 AA

FOREIGN PATENT DOCUMENTS

| JP | 53-000106 | B | 1/1978 |
| JP | 63-47534 | A | 2/1988 |
| JP | 6-35678 | | 5/1994 |
| JP | 11-280791 | A | 10/1999 |
| JP | 3515634 | B2 | 1/2004 |

* cited by examiner

SEALING DEVICE

TECHNICAL FIELD

The present invention relates to a sealing device according to a sealing technique, and more particularly, for example, to a sealing device properly used as a bonded piston seal (BPS) in automatic transmissions (AT, CVT and the like) of a vehicle such as a motor vehicle.

BACKGROUND ART

Figure 11:
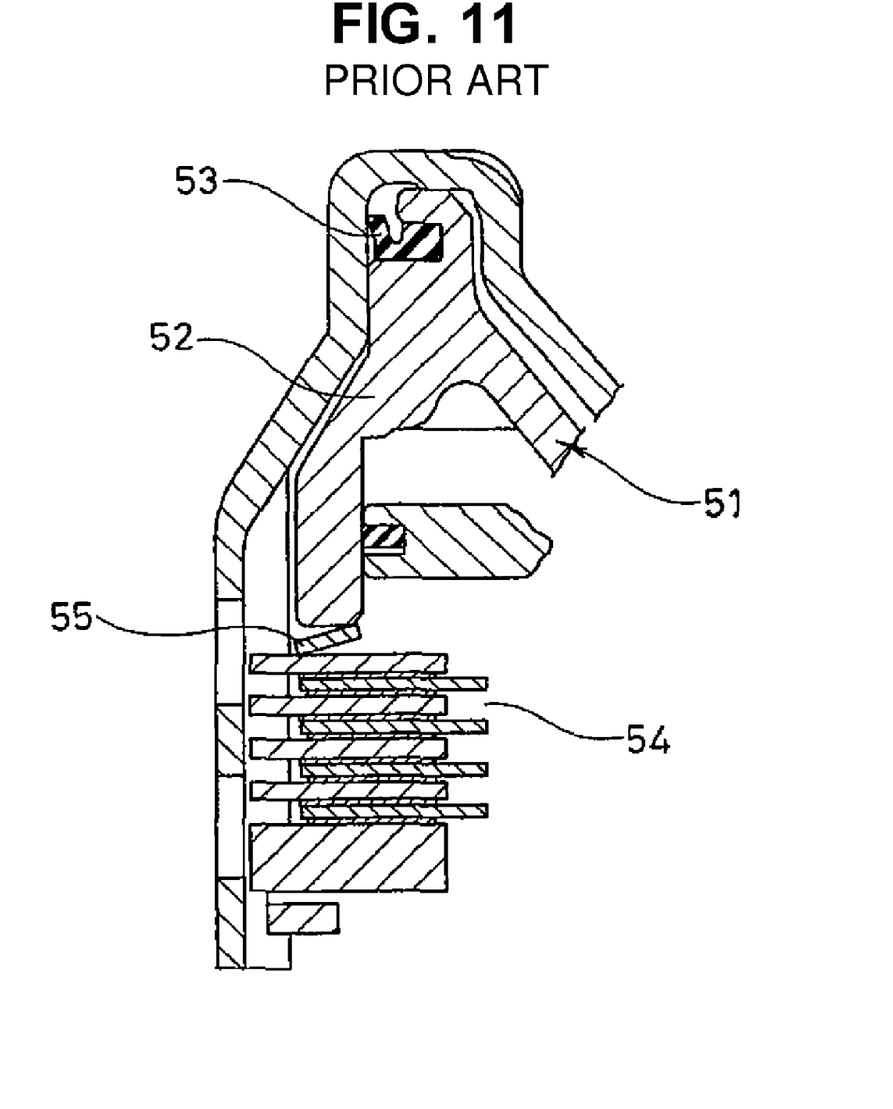
FIG. 11 is a cross sectional view of a bonded piston seal according to the conventional example.

A bonded piston seal 51 illustrated in FIG. 11 has been conventionally known. The bonded piston seal 51 includes a metal ring 52 and a seal section 53 such as a packing supported by the metal ring 52. The metal ring 52 of the bonded piston seal 51, which is displaced upwardly and downwardly in FIG. 11 by pressure supply, is made to contact to a clutch plate 54, and the clutch plate 54 is pressed by the metal ring 52, so as to engage the clutch.

Further, a plate spring (including a wave spring or a finger spring) 55 for reducing the shock at the time of engaging a clutch (changing speed) is provided between the metal ring 52 and the clutch plate 54 as a separate part, and shocking contact of the metal ring 52 to the clutch plate 54 is cushioned by spring force of the plate spring 55, so as to improve the function for preventing the speed change shock at the time of engaging the clutch.

However, according to the conventional technique, since the plate spring 55 is inserted as a separate part between the metal ring 52 and the clutch plate 54, the number of parts and the assembly manhours are increased, so that there is a problem that the cost is increased.

Patent Document 1: Japanese Patent No. 3515634

DISCLOSURE OF INVENTION

Problems to be Solved by the Invention

The present invention solves the above-described problem, and an objective of the present invention is to provide a sealing device which makes it unnecessary to insert a plate spring as a separate part between a metal ring and a mating member to be coupled therewith, such as a clutch plate, thereby achieving reduction of the number of parts and the assembly manhours.

Further, an objective of the present invention is to provide a sealing device, in which spring force of a pawl-like intimate-contact section, which is integrally formed with the metal ring instead of the plate spring is increased so as to improve durability.

Means for Solving the Problems

In order to achieve the above-described objectives, a sealing device according to a first aspect of the present invention includes a metal ring and seal sections such as packings supported by the metal ring, and the metal ring is provided with an intimate-contact region for intimately contacting to a mating member to be coupled therewith, wherein the intimate-contact region of the metal ring is integrally formed with pawl-like intimate-contact sections which are in the form of a pawl and which exert spring force on the mating member to be coupled.

Further, a sealing device according to a second aspect of the present invention is the sealing device of the first aspect, wherein the pawl-like intimate-contact sections are provided outwardly in a radial direction of the metal ring from the bottoms to top ends thereof in the plane shape.

Further, a sealing device according to a third aspect of the present invention is the sealing device of the first aspect, wherein the pawl-like intimate-contact sections are provided toward one side in a circumferential direction of the metal ring from the bottoms to top ends thereof in the plane shape.

Further, a sealing device according to a fourth aspect of the present invention is the sealing device of the first aspect, wherein the pawl-like intimate-contact sections are formed to have a branched shape, and are provided toward both sides in the circumferential directions of the metal ring in the plane shape.

Further, a sealing device according to a fifth aspect of the present invention is the sealing device of any one of the first to fourth aspects, wherein the pawl-like intimate-contact sections are formed so as to gradually decrease one or both of the plate width size and the plate thickness size from the bottoms to top ends thereof, and thereby, concentration of stress generated when the pawl-like intimate-contact sections are displaced in an axial direction is distributed to the whole of the respective pawls so as to reduce maximum stress and to improve durability against repeated deformation.

Furthermore, a sealing device according to a sixth aspect of the present invention is the sealing device of any one of the first to fifth aspects, wherein the sealing device is a bonded piston seal used for an automatic transmission, the mating member to be coupled is a clutch plate pressed and operated by the bonded piston seal, and the pawl-like intimate-contact sections are integrally formed with the intimate-contact region, which is to couple with the clutch plate, in the metal ring of the bonded piston seal.

In the sealing device according to the first aspect of the present invention having the above-described constitution, the intimate-contact region of the metal ring is integrally formed with the pawl-like intimate-contact sections which are in the form of a pawl and which exert spring force on the mating member to be coupled. Thus, the pawl-like intimate-contact sections exert spring operation instead of the plate spring in the above-described conventional technique.

The plane shape of the pawl-like intimate-contact sections are properly provided outwardly in the radial direction of the metal ring from the bottoms to top ends thereof (the second aspect), or is properly provided toward the one side in the circumferential direction of the metal ring from the bottoms to top ends thereof (the third aspect). However, if the plane shape is formed to have the branched shape and provided toward the both sides in the circumferential directions, the regions for exerting spring operation are increased, so that spring force can be increased (the fourth aspect).

Further, the pawl-like intimate-contact sections may be formed to have the fixed plate width size and the fixed plate thickness size from the bottoms to top ends thereof. However, in this case, since stress generated when operating as a spring is concentrated at the bottoms, large spring force cannot be obtained, so that durability is sometimes insufficient. Therefore, in order to solve this problem, it is proper that the pawl-like intimate-contact sections are formed so as to gradually decrease one or both of the plate width size and the plate thickness size from the bottoms to top ends thereof. If the pawl-like intimate-contact sections have such a tapered shape, it can prevent concentration of stress at the bottoms so as to distribute the stress to the whole of the respective pawls. Thus, the maximum stress can be reduced, so that durability against repeated deformation can be improved (the fifth aspect).

Effectiveness of the Invention

The present invention has the following effects.

In the sealing device in the first to third aspects of the present invention, the pawl-like intimate-contact sections integrally formed with the intimate-contact region of the metal ring exert the spring operation as described above. Thus, the plate spring as a separate part in the conventional technique can be omitted. Therefore, since the spring plate is omitted, the number of parts and the assembly manhours can be reduced, so that a sealing device having an advantageous cost can be provided.

Further, according to the fourth aspect, since the regions for exerting spring operation in the pawl-like intimate-contact sections are increased, spring force can be increased.

In addition, in the sealing device according to the fifth aspect of the present invention, the pawl-like intimate-contact sections are formed so as not to concentrate the stress at the bottom thereof. Thus, comparatively large spring force can be obtained, and durability of the pawl-like intimate-contact sections can be improved. Further, since the concentration of stress is reduced, the pawl-like intimate-contact sections are hardly deformed plastically, so that the displacement and movable range of the pawl-like intimate-contact sections are remarkably improved.

Furthermore, in the sealing device according to a sixth aspect of the present invention, the operation effect by the above-described first or fifth aspects can be obtained in the bonded piston seal used in automatic transmission.

BRIEF DESCRIPTION OF THE DRAWINGS

FIG. 6 is an enlarged view of a pawl-like intimate-contact section in the bonded piston seal, in which (A) is a plan view of it, and (B) is a front view of it.

FIG. 10 is an enlarged view of a pawl-like intimate-contact section in the bonded piston seal, in which (A) is a plan view of it, and (B) is a front view of it.

EXPLANATION OF SYMBOLS

1: Bonded piston seal (Sealing device)
2: Metal ring
3: Seal section
4: Flange section (Intimate-contact section)
5: Cutout section
6: Pawl-like intimate-contact section
7: Supporting section
11: Clutch plate (Mating member to be coupled)
12: Return spring
13: Cancel seal
14: Housing
15: Pressure chamber

BEST MODE FOR CARRYING OUT THE INVENTION

In particular, the present invention includes the following modes.

(1) A clutch engaging section in the BPS is provided with a plate spring pawl (a pawl-like intimate-contact section) having spring force and extending in the radial direction, a L-shaped plate spring pawl having spring force extending in the circumferential direction, or a T-shaped plate spring pawl having spring force extending in the circumferential direction.

(2) The plate spring pawl having a plate spring function is integrally provided at an outer peripheral section of a BPS main body.

(3) A plurality of the plate spring pawls is provided on the circumference for giving stability and preventing inclination of the BPS main body, where two or more pawls (preferably three or more pawls) are provided at equal intervals. Further, the plate spring pawl has a tension allowance contacting to a plane face of the clutch plate before engaging with the clutch, so as to cushion the shock at the time of engaging with the clutch by resilient spring force.

(4) The plate spring pawl has a shape in which the plate thickness is thin and the arm length extends to be long in the radial direction so as to enable to control the spring force without plastic deformation, as well as consideration of the width size. The prerequisite of this is to prevent plastic deformation and fatigue breaking (where the generating stress of the pawl section is within the limit range of the yield stress and the fatigue limit characteristic of a steel material.). However, when the arm length is restricted not to be long in the radial direction due to the size restriction on the structure, the plate thickness of the plate spring pawl is further thinned so as to control the spring force.

(5) The thinning of the plate thickness of the plate spring pawl becomes more difficult due to work hardening or the like, induced by pressing of a metal plate as being thinner. In this case, the arm length can remarkably extend by forming the L-shaped plate spring pawl extending in the circumferential direction where the L-shaped plate spring has less shape restriction. Thereby, if the plate spring pawl has the L shape, the spring force can be controlled without remarkably thinning the plate thickness. That is, the freedom of designing can be improved.

(6) The pawl shape is changed so as to increase spring load in general. However, if the structure has an upper limit, it is effective to increase the number of the plate spring pawl. More particularly, from the view point of space reduction, when the pawl shape has a T (or an umbrella) shape which is axisymmetrically doubled the L shape, the spring load can be easily increased twice. Further, since the T shape has symmetry with respect to the radial direction, the pawl section can be easily subjected to a plate metal pressing and bending processing.

(7) By having the above-described constitution, since the plate spring can be integrated with the BSP main body, the number of parts can be reduced, the assembly workability can be improved, and the cost can be reduced. Further, the plate thickness is thinned, and the arm length is formed to be long, so that there is no plastic deformation, and the resilient spring force of the plate spring pawl is controlled. Thus, the effect which is similar to that of the plate spring part by the conventional technique can be exerted.

(8) The invention according to has the following mode.

(8-1) If the shape of the plate spring pawl (the pawl-like intimate-contact section) to be the plate spring has a simple structure of a cantilever, the stress operated on the plate spring pawl by the spring force is concentrated on the bottom of the plate spring pawl, and thereby the large spring force cannot be always obtained. So, the plate spring pawl is formed so as to gradually reduce one or both of the plate width and the plate thickness of a plate spring fixed section toward the top end from the bottom thereof. The rates of reduction of the plate width and the plate thickness of the plate spring pawl are formed with a straight line or curved line. Further, these rates can be gradually varied to the other straight line or curved line in the middle of the reduction. As for the reducing section of the plate width and the plate thickness of the plate spring pawl, it is possible to reduce not only the section from the bottom to the top end of the plate spring pawl but also a part of the section.

(8-2) The shape of the plate spring pawl is formed so as to gradually reduce the plate width and the plate thickness from the bottom toward the top end thereof, and thereby the concentrating stress on the bottom is distributed to the whole plate spring pawl to have uniform stress. Thus, the spring force can be improved.

(8-3) According to the above-described constitution, the plate spring force can be improved and the durability can be also improved by reducing the stress.

(8-4) Further, the plate spring pawl is hardly plastic-deformed, so that the displacement and movable area of the plate spring pawl can be remarkably improved.

(9) In addition, the plate spring pawl having spring force of the present invention is effective when being provided not only at the outer peripheral side (outside) but also at the inner peripheral side (inside), and can be applied to a snap ring fixing section (for example, a centrifugal oil pressure cancel plate (or seal)) in the AT structure. Thus, space looseness can be eliminated by the spring force. That is, the plate spring pawl of the present invention can be applied to a part in which the space looseness must be eliminated at the time of fixing, bonding and connecting the metal rings in the AT structure.

EXAMPLE

Examples of the present invention will be described with drawings.

First Example

Figure 1:
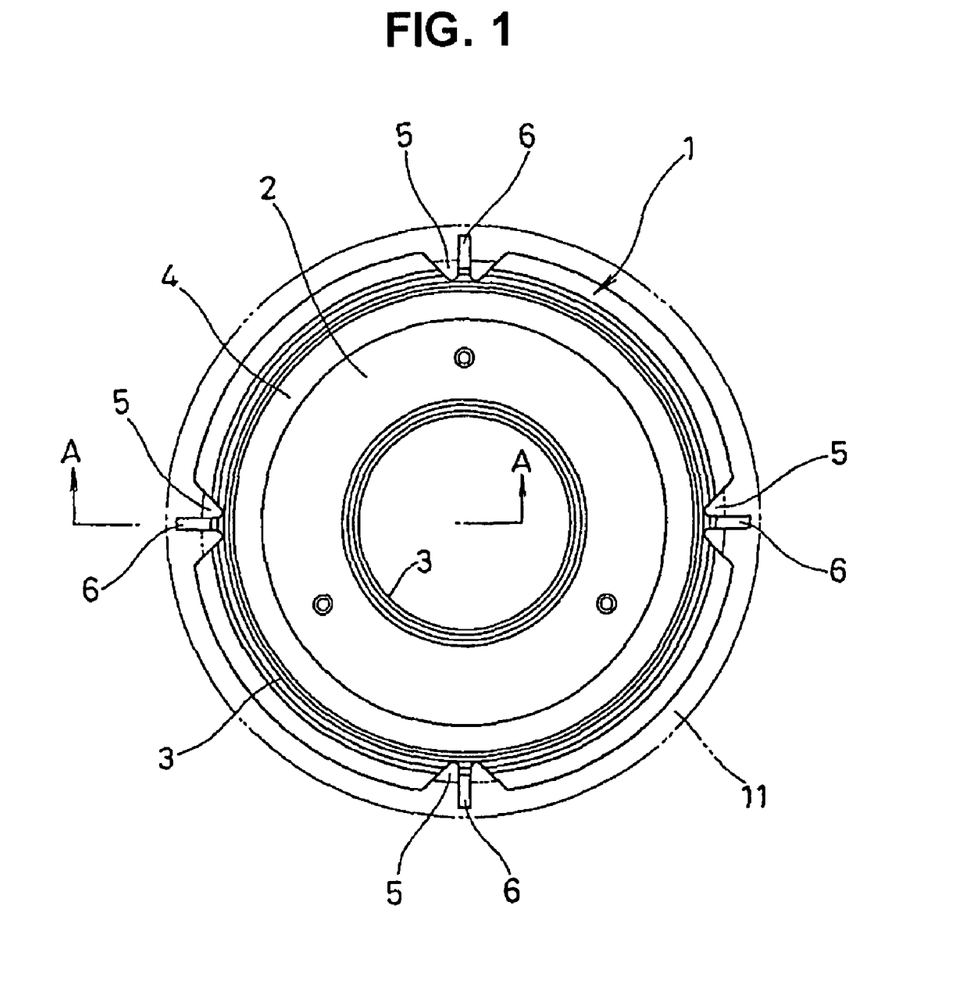
FIG. 1 is a plan view illustrating a bonded piston seal according to the first example of the present invention.
Figure 2:
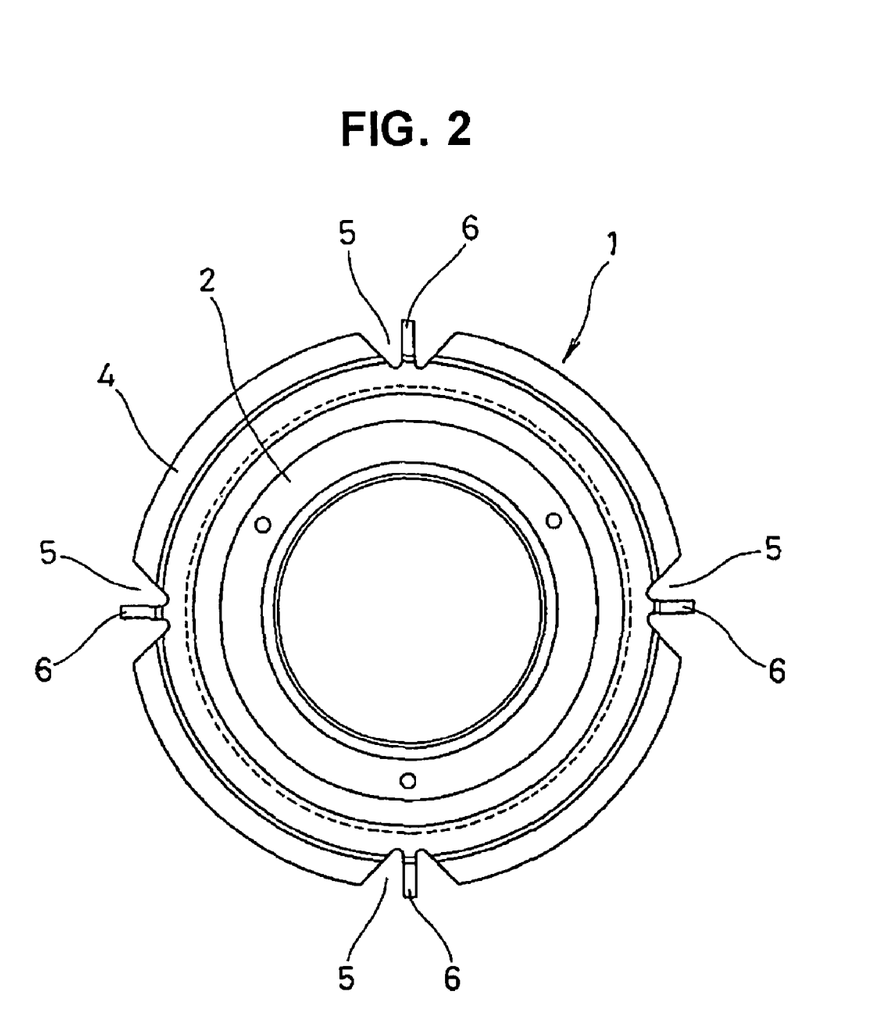
FIG. 2 is a bottom view of the bonded piston seal.

FIG. 1 illustrates a plane face of a bonded piton seal 1 as a sealing device according to the first example of the present invention, and FIG. 2 illustrates a bottom face of the seal 1. Further, FIG. 3 is a half cross sectional view of the seal 1, and is an enlarged cross sectional view taken along the line A-A in FIG. 1.

Figure 3:
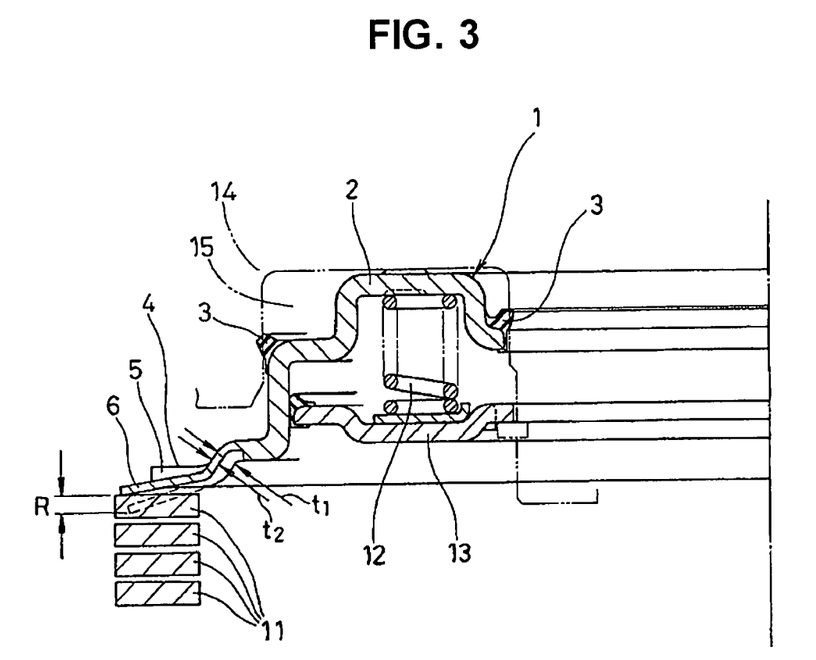
FIG. 3 is a half cross sectional view of the bonded piston seal, and is a cross sectional view taken along the line A-A in FIG. 1.

In addition, as illustrated in FIG. 3, the bonded piston seal 1 according to this example is included in a cylinder of an AT housing 14 together with a clutch plate 11, a return spring 12, a cancel seal 13 and the like. When oil pressure is introduced to a pressure chamber 15 from a pressure port not illustrated in the drawings, the bonded piston seal 1 is downwardly displaced against the elasticity of the return spring 12 so as to press a ring-like clutch plate 11 having the multiple plate clutch structure, and then engages the clutch. Further, when the oil pressure is removed, the seal 1 is upwardly returns by the elasticity of the return spring 12. Therefore, since the bonded piston seal 1 has a reciprocating function, it is called sometimes as a piston for automatic transmission.

The bonded piston seal 1 has a metal ring 2 formed by pressing a plate metal (steel). Seal sections 3 including packings (seal lips) made of a rubber like elastic material are bonded (by baking) to an outer peripheral section and an inner peripheral section of the metal ring 2. The seal sections 3 slidably intimate-contact to the inner face of the housing 14 so as to seal the above-described oil pressure or the like.

The outer peripheral section of the metal ring 2 has an outward flange section 4 as an intimate-contact section, which intimate-contacts on the plane face of the clutch plate 11 and presses the clutch plate 11 toward the downward direction in the drawings. If the outward flange section 4 has a structure which directly presses the clutch plate 11, a plate spring as a separate part is needed between the clutch plate 11 and the flange section 4 as described above.

So, in this example, pawl-like intimate-contact sections (plate spring pawls) 6, which are in the form of a pawl and exert spring force, are integrally formed with the flange section 4.

That is, a plurality of cutout sections 5 (4 sections in the drawings) is provided at an outer peripheral edge section of the flange section 4 at equal intervals, and one pawl-like intimate-contact section 6 is integrally formed at each of the cutout sections 5.

As illustrated in the drawings, the pawl-like intimate-contact sections 6 are formed to have the plate thickness $t_2$ which is thinner than the plate thickness $t_1$ of the metal ring 2 main body, and are formed in tongue piece shape extending from the bottoms to the top ends thereof outwardly in the radial direction. Further, the pawl-like intimate-contact sections 6 are bent and deformed toward the obliquely down direction, and are provided with a tension allowance R so as to contact to the plane face of the clutch plate 11 before the clutch is engaged. Thereby, the shock at the time of engaging the clutch can be cushioned by the resilient spring force.

Therefore, according to the constitution in which the bonded piston seal 1 integrally has such the pawl-like intimate-contact sections 6, the plate spring as a separate part in the conventional technique can be omitted, so as to reduce the number of parts and the assembly manhours. Thus the bonded piston seal 1 having an advantageous on the cost can be provided.

Second Example

Figure 4:
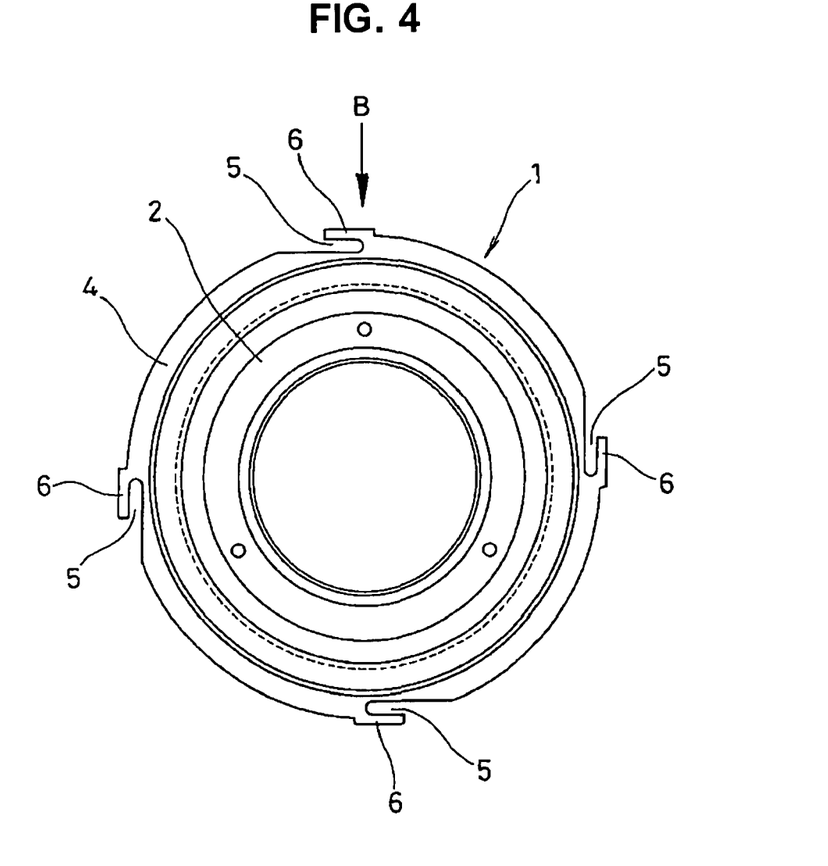
FIG. 4 is a bottom view of a bonded piston seal according to the second example of the present invention.
Figure 5:
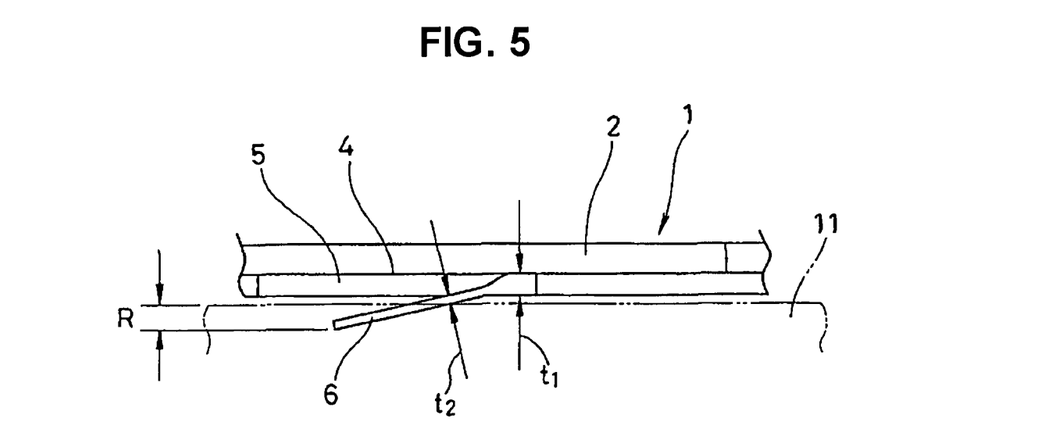
FIG. 5 is a front view of main parts of the bonded piston seal, and an enlarged view taken in the direction of the arrow B in FIG. 4.
Figure 6A:
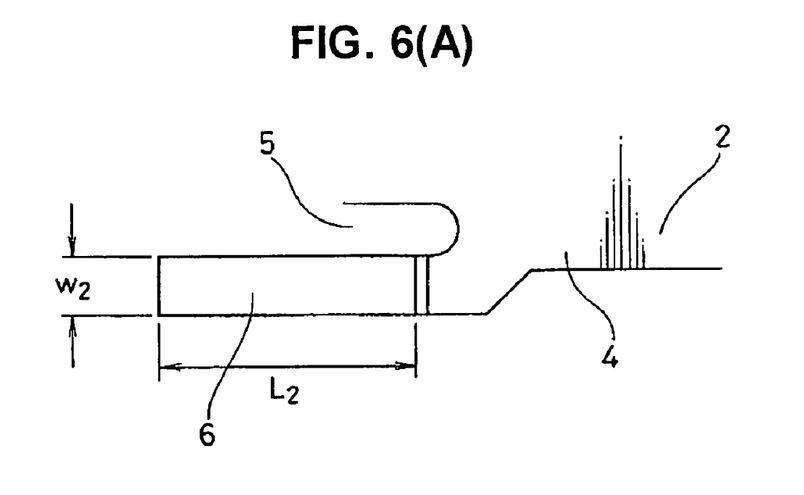
Figure 6B:
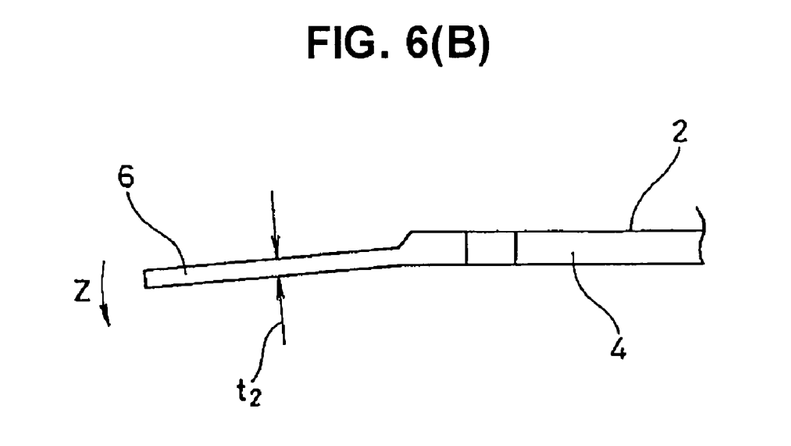

In the first example, the pawl-like intimate-contact sections 6 are formed so as to extend from the bottom regions to the top end regions outward in the radial direction of the metal ring 2. However, if the pawl-like intimate-contact sections 6 cannot extend outwardly in the radial direction by the restriction of the size or the like, they can be formed so as to extend from the bottom regions to the top end regions toward the one side in the circumferential direction of the metal ring 2, as illustrated in FIG. 4 to 6.

Third Example

Figure 7:
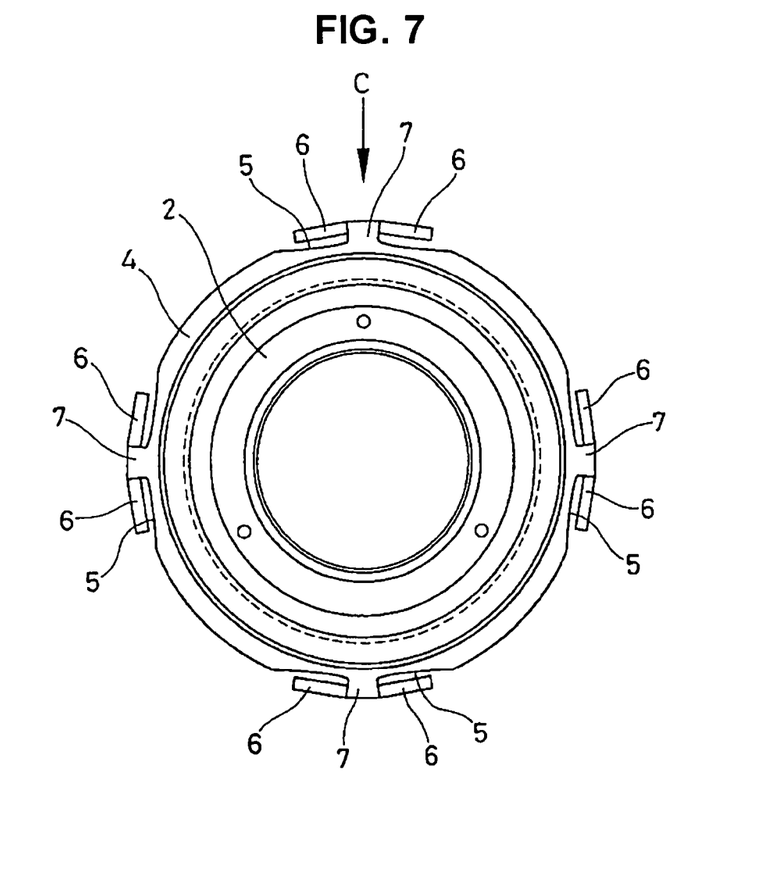
FIG. 7 is a bottom view of a bonded piston seal according to the third example of the present invention.
Figure 8:
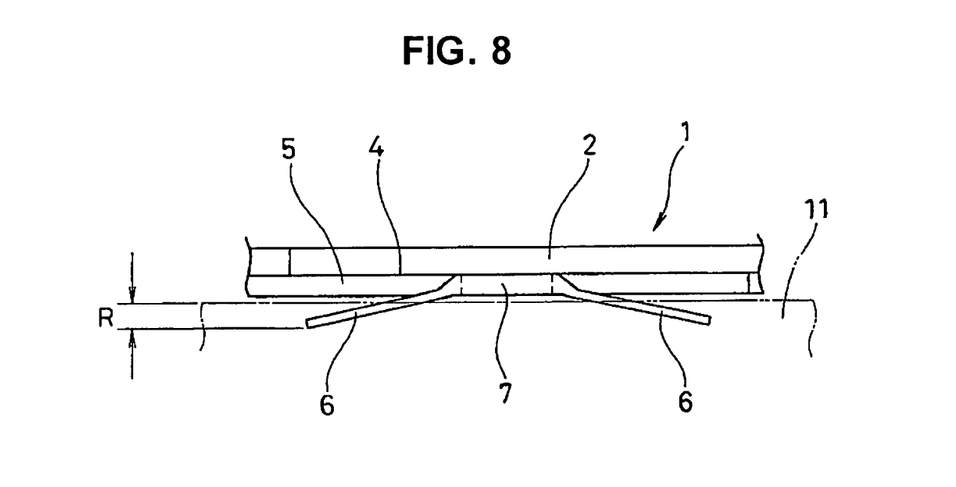
FIG. 8 is a front view of main parts of the bonded piston seal, and an enlarged view taken in the direction of the arrow C in FIG. 7.

Further, as illustrated in FIGS. 7 and 8, a supporting section 7 having a projected piece shape in which the thickness is the same as that of the flange section 4 is provided at the center of each of the cutout sections 5 outwardly in the radial direction. The pawl-like intimate-contact sections 6 can be provided from the supporting sections 7 toward the both sides in the circumferential directions of the metal ring 2. In this case, the number of the pawl-like intimate-contact sections 6 to be formed is twice (is changed from 4 to 8 in the drawings), the spring force of the whole seal can be increased.

Fourth Example

Further, in the above-described second example, the plate width $w_2$ and the plate thickness $t_2$ of the pawl-like intimate-contact sections 6 are uniformly formed over the whole length $L_2$, as illustrated in FIG. 6. In this case, since the stress generated at the time of operating of the spring of the pawl-like intimate-contact sections 6 is concentrated on the bottom regions of the pawl-like intimate-contact sections 6, the large spring force cannot be obtained, and the durability may be insufficient, as described above. Therefore, in order to solve this problem, the pawl-like intimate-contact sections 6 are formed so as to gradually reduce one or both of the plate width and the plate thickness from the bottom regions to the top end regions thereof, so as to prevent concentration of the stress on the bottom regions.

That is, as illustrated in FIG. 6, when the pawl-like intimate-contact sections 6 have the shape in which the plate width $w_2$ and the plate thickness $t_2$ are uniform from the bottom regions to the top end regions, the calculation is made as follows.

The plate width $w_2$=4.5 mm

The whole length $L_2$=24 mm

The displacement in Z direction of the top end regions (the axial direction of the metal ring 2)=0.6 mm The objective of fatigue strength of a material=460 MPa Then, as the result that the plate thickness $t_2$ is obtained from the FEM calculation, the maximum of the main stress is 457 MPa under $t_2$=1.35 mm, and the spring constant at this time is 35N/0.6 mm. The reason why the spring constant is not high is that the stress is concentrated on the bottom regions because the pawl-like intimate-constant sections 6 have the cantilever shape.

Figure 9:
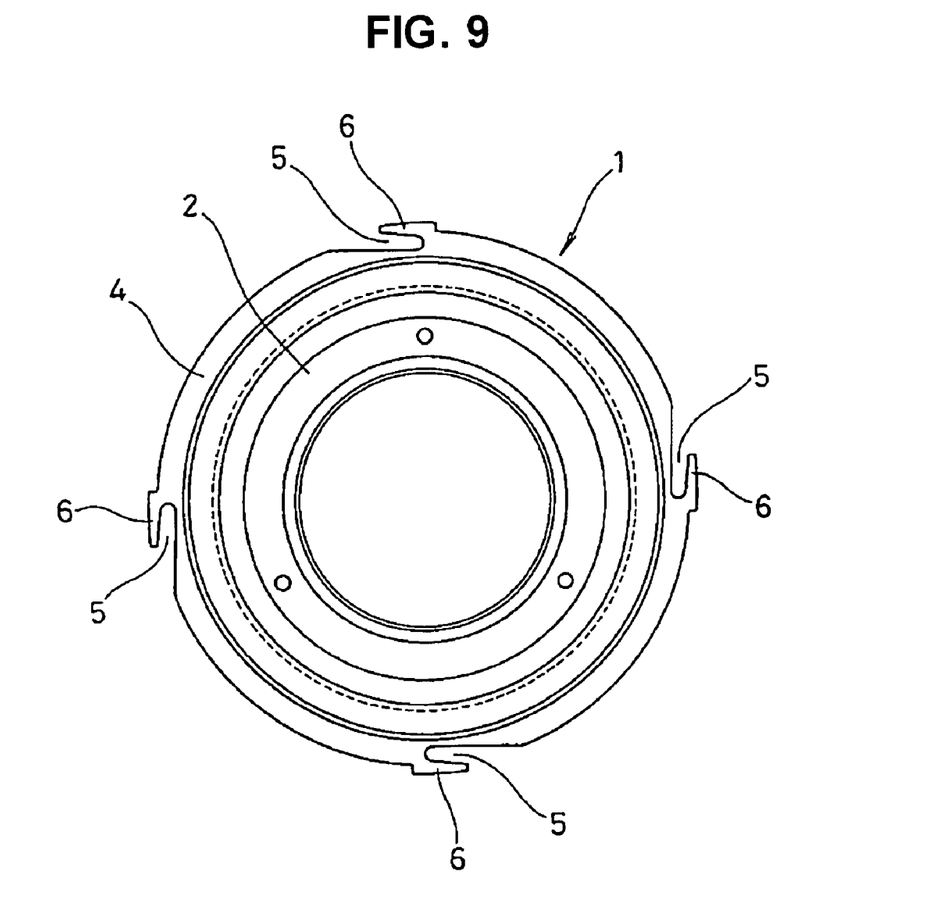
FIG. 9 is a bottom view of a bonded piston seal according to the fourth example of the present invention.
Figure 10A:
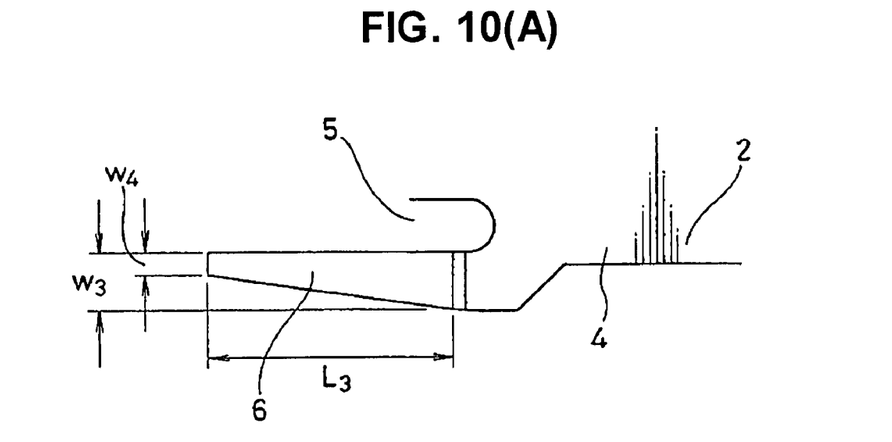
Figure 10B:
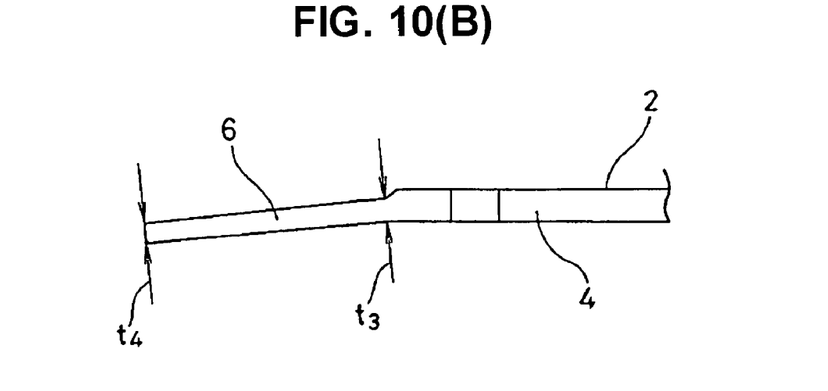

On the other hand, as illustrated in FIGS. 9 and 10 as the fourth example of the present invention, the same calculation is made without changing the whole length $L_3$ of 24 mm as follows.

The plate thickness $t_3$ in the bottom regions of the pawl-like intimate-contact sections 6=2 mm The plate width $w_3$ in the bottom regions of the pawl-like intimate-contact sections 6=4.5 mm The plate thickness $t_4$ in the top end regions of the pawl-like intimate-contact sections 6=1.5 mm The plate width $w_4$ in the top end regions of the pawl-like intimate-contact sections 6=2 mm As a result, the main stress maximum is 454 MPa, and the spring constant is 59N/0.6 mm. Thus, the spring constant can be increased about 68%. Therefore, by having such the structure, the comparatively large spring force can be obtained, and the durability of the pawl-like intimate-constant sections 6 can be improved.

In addition, the structure of the above-described fourth example can be applied to not only the pawl-like intimate-contact sections 6 directed toward the one side in the circumferential direction (the second example), but also the pawl-like intimate-contact sections 6 directed toward the radial direction (the first example) and the pawl-like intimate-contact sections 6 directed toward the both sides in the circumferential directions (the third example).

What is claimed is:

1. A sealing device comprising:
   a metal ring and seal sections supported by the metal ring, the metal ring being provided with a ring-like intimate-contact region for intimately contacting to a mating member to be coupled therewith,
   wherein cutout sections which extend in tangential directions are provided at given positions in a circumferential direction in the ring-like intimate-contact region of the metal ring,
   pawl-like intimate-contact sections which extend in tangential directions at outsides of the cutout sections are provided on the ring-like intimate-contact region, and
   each pawl-like intimate-contact section extends from a portion near a bottom of each cutout section to an opening in each cutout section and a distal end of each pawl-like intimate-contact section forms a free end to exert spring force on the mating member to be coupled.

2. The sealing device according to claim 1,
   wherein the device is characterized in that the pawl-like intimate-contact sections are formed to have a branched shape, and are provided toward both sides in the circumferential directions of the metal ring in the plane shape.

3. The sealing device according to claim 2,
   wherein the device is characterized in that the sealing device is a bonded piston seal used for an automatic transmission, the mating member to be coupled is a clutch plate pressed and operated by the bonded piston seal, and the pawl-like intimate-contact sections are integrally formed with the intimate-contact region, which is to couple with the clutch plate, in the metal ring of the bonded piston seal.

4. The sealing device according to claim 1,
   wherein the device is characterized in that the pawl-like intimate-contact sections are formed so as to gradually decrease one or both of the plate width size and the plate thickness size from bottoms to top ends thereof.

5. The sealing device according to claim 4,
   wherein the device is characterized in that the sealing device is a bonded piston seal used for an automatic transmission, the mating member to be coupled is a clutch plate pressed and operated by the bonded piston seal, and the pawl-like intimate-contact sections are integrally formed with the intimate-contact region, which is to couple with the clutch plate, in the metal ring of the bonded piston seal.

6. The sealing device according to claim 1,
   wherein the device is characterized in that the sealing device is a bonded piston seal used for an automatic transmission, the mating member to be coupled is a clutch plate pressed and operated by the bonded piston seal, and the pawl-like intimate-contact sections are integrally formed with the intimate-contact region, which is to couple with the clutch plate, in the metal ring of the bonded piston seal.

* * * * *